United States Patent
Veugen et al.

(10) Patent No.: US 9,875,243 B2
(45) Date of Patent: *Jan. 23, 2018

(54) RECOMMENDER AND MEDIA RETRIEVAL SYSTEM THAT RECORD GROUP INFORMATION

(71) Applicant: Nederlandse Organisatie voor toegepast-natuurwetenschappelijk onderzoek TNO, Delt (NL)

(72) Inventors: Peter Joannes Mathias Veugen, Delft (NL); Mattijs Oskar Van Deventer, Delft (NL); Ray Van Brandenburg, Delft (NL)

(73) Assignee: Nederlandse Organisatie voor toegepast-natuurwetenschappelijkonderzoek TNO, Delft (NL)

( * ) Notice: Subject to any disclaimer, the term of this patent is extended or adjusted under 35 U.S.C. 154(b) by 229 days.

This patent is subject to a terminal disclaimer.

(21) Appl. No.: 14/355,788

(22) PCT Filed: Nov. 1, 2012

(86) PCT No.: PCT/NL2012/050763
§ 371 (c)(1),
(2) Date: May 1, 2014

(87) PCT Pub. No.: WO2013/066176
PCT Pub. Date: May 10, 2013

(65) Prior Publication Data
US 2014/0304277 A1    Oct. 9, 2014

(30) Foreign Application Priority Data
Nov. 1, 2011  (EP) .................................... 11187406

(51) Int. Cl.
  *G06F 17/30* (2006.01)
  *G06Q 30/06* (2012.01)
  (Continued)

(52) U.S. Cl.
  CPC .... *G06F 17/30017* (2013.01); *G06F 21/6254* (2013.01); *G06Q 30/02* (2013.01); *G06Q 30/0631* (2013.01)

(58) Field of Classification Search
  CPC .......... G06F 17/30017; G06F 21/6254; G06Q 30/02
  See application file for complete search history.

(56) References Cited

U.S. PATENT DOCUMENTS 7,756,753 B1   7/2010  McFarland
2008/0127241 A1*  5/2008  Garcea ............... H04N 7/17318
                                                         725/24

(Continued)

OTHER PUBLICATIONS

Jameson et al., "Recommendation to Groups", 2007, Springer-Verlag Berlin Heidelberg 2007, pp. 596-627.*

(Continued)

*Primary Examiner* — Alexander Khong
(74) *Attorney, Agent, or Firm* — Banner & Witcoff, Ltd.

(57) ABSTRACT

A recommender system provides recommendation scores based on stored ratings for media items, for example to assist control of selection of a media item for rendering by a terminal. Data representing stored rating values for media items is stored in a storage system for use to compute the recommendation scores. A processing system records an input rating value for a first one of the media items in the storage system, based on measured activity or input of a user. Furthermore information is acquired about a group of users in the company of which the input rating value applies for the user. This information is recorded in combination with the rating value. The processing system may compute (Continued)

a recommendation score for a second group of users from the stored rating values, dependent on a comparison of the second group of users and the recorded information about the group.

13 Claims, 4 Drawing Sheets

(51) Int. Cl.
*G06Q 30/02* (2012.01)
*G06F 21/62* (2013.01)

(56) References Cited

U.S. PATENT DOCUMENTS

| | | | |
|---|---|---|---|
| 2010/0185579 A1* | 7/2010 | Hong | G06F 17/30873 706/52 |
| 2011/0137726 A1* | 6/2011 | Amatriain | G06N 5/045 705/14.52 |
| 2011/0276512 A1* | 11/2011 | Asikainen | G06Q 30/0282 705/347 |
| 2012/0291056 A1* | 11/2012 | Donoghue | H04N 21/26258 725/5 |
| 2013/0145387 A1 | 6/2013 | Van Brandenburg et al. | |
| 2014/0258027 A1* | 9/2014 | Veugen | G06Q 30/0278 705/26.7 |

OTHER PUBLICATIONS

Cho et al., "Collaborative Filtering Using Dual Information Sources", 2007, IEEE, pp. 30-38.*
International Search Report—PCT/NL2012/050763—dated: Jan. 21, 2013.
European Search Report—EP 11187406.1—dated: May 18, 2012.
Z. Erkin et al: "Privacy enhanced recommender system", Thirty First Symposium on Information Theory in the Benelux, 2010, pp. 35-42, XP082689883.
Gediminas Adomavicius and Alexander Tuzhi Lin: "Toward the Next Generation of Recommender Systems: A Survey of the State-of-the-Art and Possible Extensions", IEEE Transactions on Knowledge and Data Engineering, vol. 17, No. 6, Jun. 1, 2005 (Jun. 1, 2005), XP002689084.
International Search Report—PCT/NL2012/050764—dated: Jan. 17, 2013.
European Search Report—EP 11187404.6—dated: Dec. 27, 2011.

\* cited by examiner

RECOMMENDER AND MEDIA RETRIEVAL SYSTEM THAT RECORD GROUP INFORMATION

CROSS-REFERENCE TO RELATED APPLICATIONS

This application is a U.S. National Stage application under 35 U.S.C. §371 of International Application PCT/NL2012/050763 (published as WO 2013/066176 A1), filed Nov. 1, 2012, which claims priority to Application EP 11187406.1, filed Nov. 1, 2011. Benefit of the filing date of each of these prior applications is hereby claimed. Each of these prior applications is hereby incorporated by reference in its entirety.

FIELD OF THE INVENTION

The invention relates to a recommender system and a method of generating computer implemented recommendations. Furthermore the invention relates to a media retrieval system that comprises a recommender system for use to retrieve and render media items automatically in response to selection of media items in lists of options generated based on the recommendations.

BACKGROUND

U.S. Pat. No. 7,756,753 (Amazon) discloses an electronic catalog system that creates lists of items, such as TV programs, internet pages or movies on DVD or in video on demand systems that a user may wish to have delivered. A recommender system has the task of making a selection of items for a user, and/or to compute user specific scores for these items. From the scores a list of most highly rated items can be selected for use in a user selection interface, or to control automatic delivery of the item to the user. Ideally the score value of an item should correspond to the subjective preference for the item that the user would give after obtaining the item.

The recommender system may base its user specific score on observations of user action obtained before the computation of the score, when the user has not yet obtained the item. In conventional recommender systems score value computation by content based rating and collaborative filtering can be distinguished. Typically, content based rating involves weighing objective (i.e. user independent) values of attributes of items using user specific weights from a user profile, whereas collaborative filtering makes it possible to account for more subjective properties of the item.

Collaborative filtering assumes that the recommender system has already stored rating values (also succinctly called ratings herein) for items from other users before rating values are needed for a current user. The rating values may be derived directly from explicit rating input from the users, or inferred indirectly from user behavior, such as issuing orders for items, item viewing time etc. Collaborative filtering involves two steps: first the recommender system selects users that are most similar to the current user, and next the recommender system retrieves the rating values for a content item from these selected users, for use to generate a score for the current user. The stored rating values may be used in both steps. In the first step the recommender system may select the most similar users on the basis of correlation between the rating values that the current user and other users have given to a reference set of content items. In the second step the recommender system uses stored rating values for other content items that the current user has not yet rated.

Conventionally recommender systems compute values for individual users. U.S. Pat. No. 7,756,753 addresses the problem of computing a list of recommendations for a group of two or more users, for example to provide a list of movies that the group might want to see together. U.S. Pat. No. 7,756,753 proposes to do so by forming a merged list, from user specific lists of items for individual users in the group. For instance, if the user specific lists of users A and B are merged, and both user specific lists include a particular movie title, this movie title may be given priority over movie titles listed higher up on the user specific lists. Other factors may also be considered. For example a movie title that has already been provided to one of the users may be filtered out, or lowered in rank, before the list is displayed.

U.S. Pat. No. 7,756,753 also discloses that a score value for an item may be computed for a group as a whole. This may be based on the content of the group members' lists, taking these lists to represent votes for particular items. For instance, the rating of each item may be incremented for each occurrence of the item in a group member's suggestion list, with the increment amount optionally being dependent upon the position of the item in the suggestion list. The algorithm to generate the scores may also take into consideration extrinsic information about the preferences of the members (i.e., information other than the suggestion lists themselves). For example, for each item in the master list, a recommendation algorithm may be executed to generate an aggregate affinity value that represents the aggregate affinity of the group has for the item. The algorithm used to generate the aggregate affinity values may seek to achieve the following objectives: (1) select items that are similar items that members of the group have purchased, rated favorably, or suggested, and (2) exclude items that have already been consumed by members of the group, as evidenced by the purchase histories and/or item rating profiles of the members. To generate the score for an item, the item's aggregate affinity value may, for example, be added to a normalized member-vote-based value derived solely from the suggestion lists.

In embodiment for a group with two users A and B, the list of items that are rated most highly for one user A may be reordered according to scores computed for user B. A collaborative rating algorithm may be used to generate a score for each item appearing in user A's queue which is not in user B's queue or rental history. Each such score may then be used to determine where this item should be positioned in user A's merged queue. For instance, if user B is predicted to have a strong (or weak) affinity for an item in user A's queue, this item may be moved up (or down).

None of these solutions makes it possible to make full use of information about the composition of the group. No suggestion is provided how directly or indirectly derived score values that are obtained from the group can be used to compute scores later for other users. The composition of the group is not used to determine the computation of the score other than as a means of selecting scores for individual group members.

Privacy concerns involved with recommender systems are discussed in an article by Z. Erkin et al, titled "Privacy enhanced recommender systems", published at the Thirty first Symposium on Information Theory in the Benelux", Rotterdam 2010, pages 35-42. User rating values for content items can give away information that a user would not like to be publicly known, or known by commercial parties. On the other hand, collaborative filtering depends on a comparison of ratings from different users, which normally means that at least one party must have access to rating values of a multitude of users. Erkin et al combine these conflicting requirements by encrypting the rating values using a homomorphic encryption scheme (i.e. an encryption scheme that has the property that the result of applying arithmetic operations on encrypted ratings is the same as encrypting the result of applying a corresponding arithmetic operation to clear ratings). This makes it possible to compute correlations between ratings given by different users in a single computer without decrypting the ratings in that computer. In addition Erkin et al propose the use of secure multi-party computation techniques to select the users with the highest correlations. This prevents that any single party has access to the ratings of individual users. Erkin et al do not consider recommendations for groups of users.

SUMMARY

A recommender system provides recommendation scores based on stored ratings for media items, for example to assist control of selection of a media item for rendering by a terminal. Data representing stored rating values for media items is stored in a storage system for use to compute the recommendation scores. A processing system records an input rating value for a first one of the media items in the storage system, based on measured activity or input of a user. Furthermore information is acquired about a group of users in the company of which the input rating value applies for the user. This information is recorded in combination with the rating value. The processing system may compute a recommendation score for a second group of users from the stored rating values, dependent on a comparison of the second group of users and the recorded information about the group for which it applies.

Among others, it is an object to provide for better adaptable generation of recommendation scores in a recommender system.

In embodiments, it is an object to expand the number of machine detectable aspects of viewer behavior that can be used automatically to generate recommendations.

In embodiments, it is an object to provide a media retrieval system that comprises to retrieve and render media items selected using machine detectable aspects of viewer behavior.

A recommender system is provided that comprises:
a storage system for storing data representing stored rating values for media items;
a processing system configured to record an input rating value for a first one of the media items in the storage system, based on measured activity or input of a user, in association with information about a first group of users in the company of which the input rating value applies for the user.

The recording of information about the group for which the rating value applies makes it possible to generate recommendations that are better adaptable to actual viewing circumstances in terms of the company in which the user is about to view a media item.

The processing system may be configured to compute a recommendation score for a second group of users from the rating value, dependent on a comparison of the second group of users and the associated information about the first group of the rating value.

The information about the first group may comprise identifications of the individual users with which the user viewed or listened to the media item when the input rating value was determined. This information may be obtained from manual user input, or it may be determined automatically, for example by means of biometric recognition, or by reading identification tokens, such as RFID tags, carried by the users.

In another embodiment, the information about the first group may be less direct than identifications of the individual users: the user rating value may be recorded with only an indication of the group type (family with kids, all male adults, all female adults etc.) A selection from one of a predetermined number of group types may be performed automatically on the basis of the identifications of the individual users, or it may be input directly by the user. In the latter case, the user could enter a plurality of ratings for the same media item for different types of group.

The information about the first group may be used to compute a recommendation score in a group dependent way. In the computation of a recommendation score for a second group, input ratings from a user may be weighted differently dependent on the first group for which the user has provided the input rating. The weight may be increased with increasing overlap between the first and second group for example, using a larger weight when the groups share two users than when they share only one user for example. In a collaborative filtering system, sums of such weighted ratings for respective ones of a set of media items may be used to select users that have ratings for this set that are most highly correlated with these sums. In this case the recommendation score for a further media item may be generated from ratings for the further item from these selected users. Similarly, the recommendation score may be computed from such a sum of weighted ratings, with weights dependent on overlap between groups. In another embodiment, the recommendation score for a user in a second group may be computed from a sum of weighted ratings from other users, wherein the weights depend on a result of comparing a group type of the second group with the group type of the first group provided with the rating that is to be weighted, or by determining a degree to which the composition of the second group matches the group type of the first group (e.g. by testing whether all members of the second group are adult males when the group type of the first group is "adult males").

In an embodiment information that is informative about the composition of the first group is transmitted from a user terminal where the user IDs are present at most in encrypted form. This provides a protection against abuse of the information. In an embodiment information about the identity of group members is used in a private information retrieval protocol to retrieve rating values for the group members from the storage system.

In an embodiment, the information about the first group is encrypted at a user terminal, and only the encrypted information is recorded, the comparison of the first and second group being performed in a privacy service provider based on the encrypted information.

In an embodiment, the recommendation score is computed by synthesizing an auxiliary rating value for the media item of the first one of the rating values by assigning a weight to the first one rating values based on a result of said comparing the recorded information with the further information.

A method of generating a recommendation score based on stored rating values for media items is provided, the method comprising receiving a request for the recommendation score in combination with information about the composition of a group of users for which the recommendation score is requested;

retrieving stored rating values for a first one of the media items;

retrieving encrypted information about the identity of users associated with the retrieved rating values;

transmitting the retrieved encrypted information and the information about the composition of the group of users from a processing system to a privacy service provider;

computing weights for the retrieved rating values from the encrypted information and the information about the composition of the group of users, using the privacy service provider;

computing a weighted sum of the retrieved rating values, multiplied by the computed weights in the processing system.

BRIEF DESCRIPTION OF THE DRAWINGS

These and other objects and advantageous aspects will become apparent from a description of exemplary embodiments using the following figures.

DETAILED DESCRIPTION OF EXEMPLARY EMBODIMENTS

Figure 1:
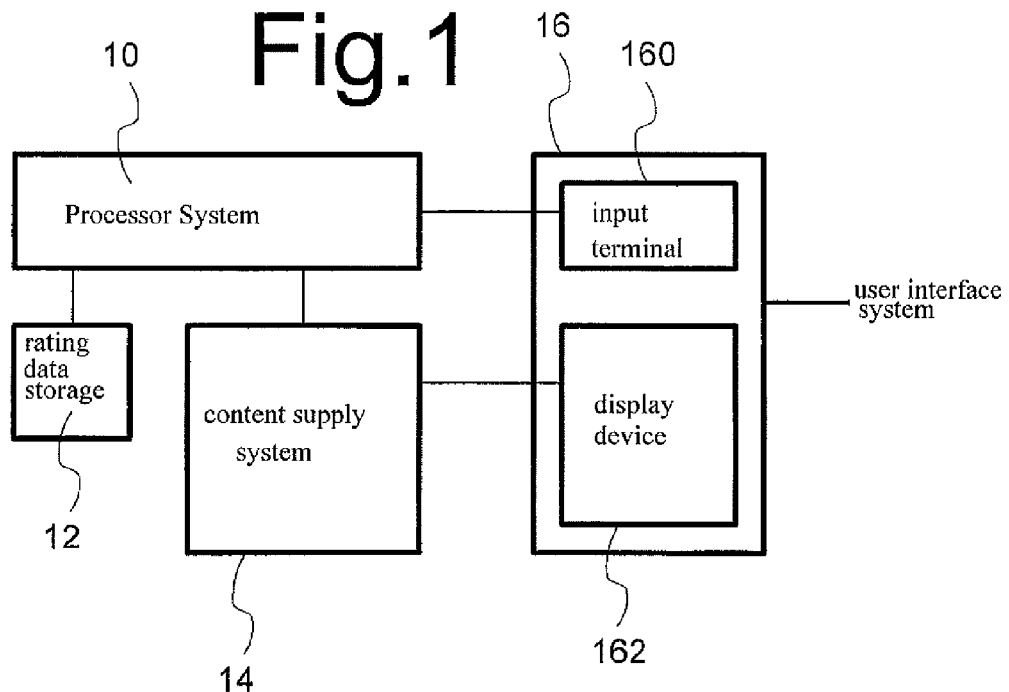
FIG. 1 shows a content handling system

FIG. 1 shows a content handling system, comprising a processor system 10, a rating data storage 12, a content supply system 14 and a user interface system 16 comprising an input terminal 160 and a display device 162. Processor system 10 is coupled to rating data storage 12, content supply system 14 and user interface system 16. User interface system 16 may also have a direct connection to content supply system 14. Although only a single user interface system 16 is shown by way of example, it should be appreciated that the content handling system may comprise a plurality of such user interface systems 16 coupled to processor system 10.

Processor system 10, content supply system 14 and user interface system(s) 16 may be coupled to each other via a communication network such as the Internet for example. Content supply system 14 may be a proprietary system (owned and controlled by a single content supplier), comprising storage devices that store content items such as movie files, electronic books etc., configured to transmit selected information from the storage devices via the communication network in response to requests from user interface system 16. However, in alternative embodiments, content supply system 14 may be an open system with storage devices for a plurality of suppliers, or content supply system 14 may be configured to control physical delivery of tangible items. Processor system 10 operates to recommend selections of the items.

In operation, processor system 10 computes scores for content items that are available for supply from content supply system 14 using a collaborative filtering algorithm. As far as this concerns individual users, this may be done in a way that is known per se. Processor system 10 may have a program that controls it to receive ratings for content items from user interface system(s) 16 and store these ratings in rating data storage 12. A table with records (user-ID, item-ID, rating value) may be maintained for example, relating a rating value to a specific combination of a user and a content item.

Optionally, processor system 10 may acquire the rating values for items from explicit rating input from users, for example at user interface system 16, or from measurements of user behavior, such as detection of requests for delivery of items triggered by user input at user interface system 16, measurement of duration of a time interval during which user interface system 16 renders an item in response to user input etc. User interface system 16 may be configured to increase the rating value for an item for a user if selection of the item is detected when the user uses user interface system 16, and/or increase the rating value increasingly with growing measured duration of rendering when the user uses user interface system 16. User interface system 16 may supply such ratings to processor system 10. Alternatively, user interface system 16 may supply the measurements to processor system 10, processor system 10 computing ratings using the measurements.

Processor system 10 may have a program that controls it to compute correlations $C(i,j)$ between sets of ratings $R(i,m)$, $R(j,m)$ from different users (indexed by i, j) for a set of reference items (indexed by m), receive a rating request from a user via a user interface system 16, identify one or more other users j with highest correlations $C(i,j)$ with that user i and return ratings $R(j,n)$ for items (indexed by n) entered by the other users. The set of reference items may be adapted using selection of items m for which there are stored ratings from users i, j. The set of reference items may depend on the users. The ratings $R(j,n)$ may be used to determine scores $S(n)$ for the items and to display a list of items on display device 162, selected and/or ranked according to the score $S(n)$. The score $S(n)$ may be a weighted sum of rating values $R(j,n)$ from users for the item n, with weights associated with the users j that are selected dependent on the correlation $C(i,j)$ with the user, the weight decreasing with decreasing correlation. Alternatively, or in addition, users j may be selected based on the correlation and only the rating values for one or more selected users may be used to compute the score.

In an embodiment, items n that have already been seen (i.e. consumed) by the user i may be kept from the list of recommendations, or the score values $S(n)$ may be computed dependent on stored data about use of the item n by the user i, for example by lowering the score by a predetermined factor or amount if the user i has already seen the item. The items in the list provided by processor system 10 to user interface system 16 may be accompanied by selection information that enables user interface system 16 to send requests for the content items to content supply system 14 automatically in response to selection input on user interface system 16.

In addition to conventional collaborative filtering, processor system 10 also provides for group based scores, including scores computed for recommendation to a group of users. A score may be provided for a movie for example, computed specifically for joint viewing by a group of persons in each other's company.

Figure 2:
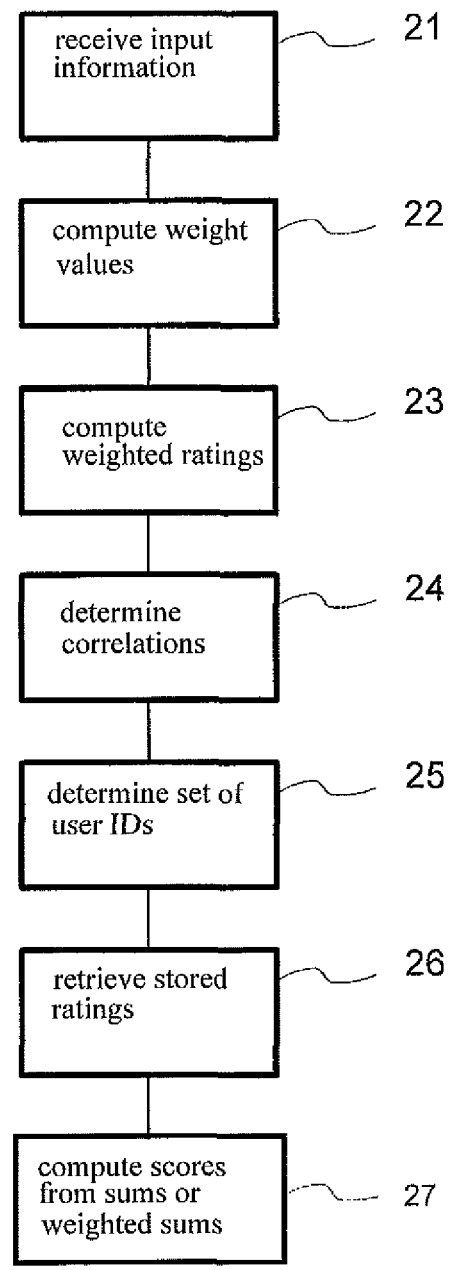
FIG. 2 shows a flow chart of group input based score computation

FIG. 2 shows a flow chart of a first embodiment of group input based score computation. In a first step 21 processor system 10 receives input information indicating the composition of a current group, for example in terms of user IDs of the individual members of the groups, as used in rating data storage 12. The input information may be received from a user by user interface system 16 and transmitted to processor system 10.

In an embodiment, user interface system 16 comprises a biometric user recognition system to determine the identity of the users in the group. The biometric user recognition system may comprise a face recognition system, a voice recognition system or a fingerprint recognition for example, user interface system 16 transmitting recognition results from the biometric user recognition system to processor system 10. In another embodiment user interface system 16 may comprise a token reader, such as a smart card reader or magnetic card reader, user interface system 16 transmitting output from the token reader to processor system 10 to indicate the identity of the users. In another embodiment user interface system 16 may comprise a keyboard, or selection buttons, user interface system 16 transmitting information input on the key board or about the buttons that have been pressed to processor system 10 to indicate the identity of the users.

In a second step 22, processor system 10 computes weight values for user IDs in the context of the current group. Equal non-zero weights may be assigned to all user IDs of individual users of the current group for example (e.g. weights of 1/N, wherein N is the number of users in the group, or simply weights of 1 if normalization of the weights is not needed) and zero weights may be assigned to user IDs of individual users that are not in the current group.

In an embodiment, rating data storage 12 may also store ratings given by groups of users. In this embodiment, previous ratings may be stored in association with data that defines a group composition for the stored rating. This may be implemented for example by introducing user IDs for such groups as well, recording the user IDs associated with the group ID, for example as a table of records (user ID, user ID) for group members, wherein the first entry is the user ID assigned to a group and the second ID is the user ID assigned to the group member, and storing records (user-ID, item-ID, rating value) with user IDs assigned to the group.

In the embodiment wherein stored ratings for groups are available, second step 22 may further comprise that processor system 10 computes weight values for stored group user IDs relative to the current group. These weight values may deviate from the weight values for individual users. These weight values may be computed dependent on the size of the overlap between the groups. The weight value of a stored group relative to a current group may be set to the number of users that are a member of both, divided by the number of users in the stored group, for example.

In a third step 23, processor system 10 computes weighted ratings R'(j) for a set of reference items, for each reference item as a weighted sum W(i)*R(i, m) of stored ratings R(i, m) from rating data storage 12, using stored ratings R(i, m) for the reference item (m) associated with different user IDs (i), weighted by the weights W(i) computed for the different user IDs in second step 22. Although an embodiment using sums has been described, it should be appreciated that alternatively products may be used, which corresponds to summing logarithms.

In a fourth step 24, processor system 10 determines correlations between the computed weighted ratings R'(j) for the reference items (j) from third step 23 with ratings for different user IDs for the same reference items (j) from rating data storage 12. The weighted ratings R'(j) for different reference items (j) form the components of a rating vector V' and the stored ratings from different users ID for these reference items form similar vectors V(ID). Processor system 10 may be configured to compute a cosine correlation CC(ID) for example, in terms of $$CC(ID)=V'*V(ID)/(\operatorname{sqrt}(V'*V')*\operatorname{sqrt}(V(ID)*V(ID)))$$

wherein sqrt is the square root function and V'*V(ID), V'*V' and V(ID)*V(ID) are inner products of vectors (sums of products of corresponding elements). Instead of the cosine correlation, other known types of correlation may be used, such as rank correlation. Any known technique for computing correlations between ratings for individual users may be used to compute correlations with the computed rating for the group.

In a fifth step 25, processor system 10 determines a set of user IDs that has highest correlation values. A set of a predetermined number L of user IDs may be selected for example for which the correlation C(ID) is greater than for any user IDs outside the set (or at least not smaller), or all user IDs with a correlation C(ID) above a threshold value may be selected for example. In an embodiment, the threshold is automatically selected dependent on information about the composition of the group. In an embodiment, the threshold may be selected dependent on the composition of the group.

In a sixth step 26, processor system 10 retrieves stored ratings for one or more items associated with the selected user IDs from rating data storage 12. Furthermore, processor system 10 may compute 27 scores S(n) from sums of these ratings, each for a respective item n. Optionally, weighted sums may be used, with weights that decrease with decreasing correlation (as used herein this does not exclude that the same weights are used for different correlation values that differ no more than a threshold amount). Processor system 10 supplies these scores or ratings from selected users, as scores to user interface system 16, which may use these scores to rank items and/or select items and display the ranked and/or selected items. In one example the item with the highest score for each user ID may be selected and these highest scoring items may be displayed. User interface system 16 may perform the ranking and selection actions, but alternatively, processor system 10 may perform at least part of these ranking and selection actions and supply the result to user interface system 16.

Figure 5:
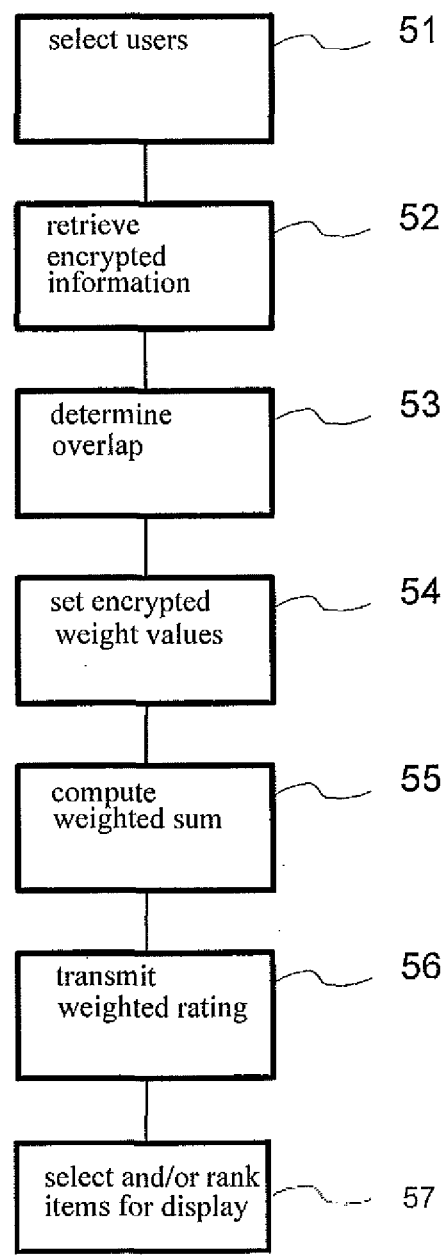
FIG. 5 shows a flow chart of weighting for computing recommendation scores

The embodiment of FIG. 5 provides for use of synthetic ratings to compute correlations, wherein the synthetic ratings are obtained from a sum of stored ratings for group members (optionally a weighted sum). In another embodiment, the correlation for the group may be computed from a combination of computed correlations for the individual members of the group. That is, the stage at which results for the members of the group are combined may be shifted.

In this embodiment for each member i of the group a correlation between the vector of ratings R(i,m) for items m and the vector of ratings R(j,m) for these items m and a different user j. From these vectors correlations C0(i,j) between the members i and the other users may be computed, for example using the cosine correlation or other correlation as described in the preceding. Then, a correlation CC(ID), where ID corresponds to the identification of the user j may be computed for the group from the correlations C0(i,j) for the group members. The correlation for the group may be taken from a sum of the correlations of the members (optionally a weighted sum), or another combination of the C0(i,j) for the members.

Similarly, to computation of correlations between a group and an individual user, correlations between groups may be computed (a) by first computing weighted ratings for the groups from stored ratings, and next determining a correlation between the weighted ratings or (b) by first computing correlations between stored ratings for individual members and next combining these correlations, or (c) by first computing correlations between stored ratings for different groups and next combining these correlations. In the embodiment wherein correlations between stored ratings for individual members of a first and second are computed, an order of the members may be defined in each group, members of the same rank in the different groups being correlated, these correlations being combined (e.g. by weighted summing). In this case combined correlations may be computed for different possible orders, the correlation for the order that produces the highest correlation being used as the correlation between the groups. This provides for group matching. In another embodiment, for each member of the first group the correlations with all members of the second group are correlated and the highest of these correlations is used for the first group members.

Optionally, processor system 10 may acquire ratings for items for the current group, and add the acquired ratings to rating data storage 12 associated with the group ID. A group ID may be created for the group, so that the rating can be stored much as they are for individual users. Information about the composition of the group is stored in association with these ratings, for example for the group ID, or for each rating. Ratings may be determined from explicit input, or from detected user behavior, such detection of item selection at user interface system 16, measured rendering time etc. As a result, these ratings become available for subsequent score computation.

In an embodiment processor system 10 or user interface system 16 in sixth step 26 computes an average A(m) of the retrieved ratings R(i,m) for the same item m from different users i. In this embodiment, the items may be ranked according to the average A(m). In a further embodiment, a weighted average A(m)=sum W(i)*R(i,m) may be used, wherein the ratings R(i,m) for an item m for different user IDs i are weighted with weights W(j).

Processor system 10 or user interface system 16 may determine these weights W(i) in various ways. The weights may be determined based on the correlation C between the ratings for the reference items for example, increasing weight being given with increasing correlation. The weights may be determined based on a correlation between user attribute values of the current group and attribute values in a stored user profile of the user i for example. Attributes associated with a user such as age, sex, interest ratings for different genres of item, interest ratings for different actors or authors could be used. In a further embodiment the weights may be determined at least partly based on overlap between the current group and the users. Thus a higher weight may be given to a rating R(i,m) given by a user i if the user i is a member of the current group than if the user i is not a member.

In an embodiment wherein a stored rating may be associated with a further group of a plurality of users, processor system 10 or user interface system 16 may determine the weight W at least partly based on overlap between the current group for which the ranking or selection is made and the further group that has supplied the rating R(i,m). A higher weight may be given to a rating R(i,m) given by a group user i with increasing overlap with the group user i.

In an embodiment the determination of correlated users using second to fifth step 22-25 based on correlation between ratings given by users may be replaced by, or combined with, determination of correlated users based on correlation between attributes of group members and attributes in stored user profiles of users. In the version of the embodiments wherein the steps are replaced, second to fourth step 22-24 may be replaced by steps of determining attribute values of members of the current group, retrieving attributes values from user profiles from rating data storage 12, and computing correlations between the attribute values of the members of the current group and the retrieved attributes values for respective user IDs. Fifth step 25 may then be modified to select L most correlated users.

In the embodiment wherein a user ID may also represent a further group of a plurality of users, processor system 10 may use overlap between the current group and the further group to determine the correlation. A higher correlation may be assigned with increasing overlap.

In an embodiment the determination of correlated users may be based on correlation between synthetic attribute values for the group and attributes in stored user profiles of users. In this embodiment second the synthetic attribute values may be computed by averaging attribute values of members of the current group. In the embodiment wherein a user ID may also represent a further group of a plurality of users, the average may be weighted according to overlap. Processor system 10 may be configured to determine overlap between the current group and the further group. A higher weight may be assigned with increasing overlap.

Group Dependent Ratings

In the previous embodiments processor system 10 is programmed to use only the identity of the group members to compute the weights used to select user IDs with high correlation and/or to weigh ratings. In a further embodiment group type information may be used as well. For example, information may be entered to identify whether the group is a family, a group of males in a specified age range, a group of females in a specified age range etc. This information may then be used to compute weights and/or to enter ratings.

In an embodiment a predetermined set of group types is used. In this embodiment, when collecting rating values, user interface system 16 is configured to request a user to input a plurality of ratings for an item, each for a respective one of the group types. As may be noted, this requires the user to enter a plurality of possibly different ratings for the same item. User interface system 16 is configured to transmit these ratings to processor system 10, which stores them in association with an identification of the item and the group types. A table with multiplets (User ID, Item ID, group type, rating value) may be stored for example.

In another embodiment, the group type dependent ratings may be inferred from ratings based on user actions (such as detected viewing duration, detected selection actions etc.). In this case the type of group must also be determined. Processor 10 may be configured to query the user for an indication of the type of group. Alternatively, the group type may be determined based on detection of the composition of a current group. User interface system 16 and/or processor system 10 may be configured to classify the group by determining user IDs of the members of the group, retrieving stored attribute values associated with these user IDs and selecting group type based on the attributes. In this case attributes associated with user IDs may be used. Rating data storage 12 may store a table with multiplets (User ID, Sex, Age) and optionally additional attributes such as flags indicating whether the user likes/dislikes specific genres (newscasts, sports, society news, thrillers etc.).

Processing system 10 may have respective classification functions, each for a respective predetermined group type to determine from the attributes whether the group belongs to said group type. For example, for the group type "group of adult males", the function may be designed confirm that the group belongs to this type when the sex attribute for all of the user IDs of the detected members of the current group indicates that the member is male. Other group types could by female groups, mixed groups, further qualified as groups within respective predetermined age ranges, groups not limited to such an age range, groups with shared genre preferences or mixed genre preferences etc. Processing system 10 may then store the entered or computed rating for the item may in association with one member of the group, or ratings may be stored each in association with a different, each in association with the group type that has been entered or determined.

At the time of generating recommendation scores, a group type dependence may be used to compute recommendations for a current group. This may be applied to selection of correlated users, whose ratings will be used to compute recommendations and/or to weigh ratings from users in order to form recommendation scores for items and/or to select which ratings from users should be used. In this case attributes associated with user IDs may be used.

Processor system 10 may be configured to use the group type dependence to select correlated users. In second step 22, processor system 10 may compute respective weight values for combinations of group type and user IDs for use with the current group. Processor system 10 may be configured to determine the weight dependent on a match between the current group and the group type for example. For each group type a match function may be defined that depends on stored attributes for user IDs of the group members and the match with the group type may be computed by applying this match function for the group type to the stored attributes.

For example, for the group type group of adult males, the match function may be designed to make the weight zero when the sex attribute for any of the user IDs of the indicated members of the current group indicates that the member is female. Similarly the match function may be designed to make the match function zero when the age attribute group for any of the user IDs of the indicated members of the current group indicates that the member below a threshold age. In other examples, the match function may vary weights more gradually, for example, for a group type "children aged about 10", the weight may vary with difference between age attributes of the user ID and the age attributes of the group members.

Similarly (and possibly independent of use of group type in the determination of synthetic rating values), in the determination of correlations $C(i,j)$ between users the group type may be used to cause correlations to be computed only from rating values for corresponding group types, or weighted according to the match between the group type for which the rating was determined for user j and the group type for which the correlation is determined for user i.

Similarly (and possibly independent of use of group type in the determination of synthetic rating values and/or the correlation), in the embodiment wherein processor system 10 combines correlations $C(i,j)$ for different users i of the group in order to compute a correlation for the group, correlations for group type of the current group type may combined, or group type dependent weights may be used to combine the correlations for individual users. For this purpose weight computations may be used that are similar to those described for selection of correlated users.

Similarly (and possibly independent of the other described uses), processor system 10 may be configured to weigh ratings from users in order to form recommendation scores $S(n)$ for items n. For this purpose weight computations may be used that are similar to those described for selection of correlated users. Processor system 10 may be configured either to weigh ratings from users in order to form recommendation scores for items or to select correlated users or both. In another embodiment processor system 10 may be configured to select a group type based on the attributes of group members and to use only ratings associated with the selected group types in the process of FIG. 2.

Secure Implementation

It is desirable that guarantees can be given that information about the composition of the group is not freely available throughout the system. Therefore, in advantageous embodiments the process of determining recommendations is performed by means of a process that keeps information about the composition of the group inaccessible outside user interface system 16.

In one embodiment first to third steps 21-23 are performed in user interface system 16. That is, the synthetic ratings $R'(m)$ for different reference items m are computed in user interface system 16 and supplied from there to processor system 10 for use in the remainder of the process. In a embodiments wherein user interface system 16 reads tokens (e.g. IC cards) presented by the members of the group, ratings $R(i,m)$ given by the different members may be stored in said token an read by user interface system 16 for use in this computation.

In a further embodiment, only encrypted versions of the ratings $R(i,m)$ are supplied to user interface system 16 by the tokens. In this embodiment a homomorphic encryption scheme may be used that has the property that for any numbers x, y the encryption $E(x+y)$ of the sum of these numbers equals the product $E(x)*E(y)$ of the encryptions $E(x)$, $E(y)$ of these numbers in some ring or field, for example module a number N. Such homomorphic encryption schemes are known per se. In this embodiment, user interface system 16 may compute an encrypted version the synthetic rating value (leaving out normalization) without access to clear rating values, from a product of the encrypted rating values. In this case, no normalization (division by the number of users in the group) of the synthetic rating value is performed. However, for the selection of the most correlated users, this may be unnecessary. Normalization may be needed only when rating values for group users are used, but even in this case, and when normalization is not used, different relative weights may be realized by multiplying with different integer (w) powers $E(R(i,m))^w$ of the ratings $R(i,m)$.

In the further embodiment wherein only encrypted versions of the ratings $R(i,m)$ are supplied to user interface system 16, use may alternatively be made of a secure multiparty computation protocol to compute the synthetic ratings. This makes it possible to account for more factors in the computations, such as user attribute values.

In the art secure multiparty computation refers to protocols that provide for the computation of encrypted sums, differences and products of numbers, using encrypted versions of these numbers as input. Any known secure multiparty computation protocol may be used. In one example, use is made of a homomorphic encryption scheme, where $E(x+y)=E(x)*E(y)$. In this case, cooperation between a first and second subsystem (e.g. distinct devices) may be used to perform the sum and product operations. The first subsystem is configured to have access to the encrypted numbers E(x), E(y) and an encryption key of the encryption scheme, but not to the decryption key. The second subsystem is configured to have access to the decryption key, but not to the numbers (encrypted or not).

In this system the first subsystem is configured to compute encrypted sums E(x+y) of encrypted numbers x, y simply by multiplying their encryptions E(x), E(y). In order to compute an encrypted product E(x*y) of a first and second number x, y, the first subsystem is configured to generate a first and second random number Rx, Ry, to compute encryptions E(Rx), E(Ry) of these random numbers, multiply the encryptions of the random numbers with the encrypted numbers E(x), E(y) respectively and transmit the resulting products E(x)*E(Rx), E(y)*E(Ry) to the second subsystem. The products E(x)*E(Rx), E(y)*E(Ry) equal the encrypted sums E(x+Rx), E(y+Ry). The second subsystem is configured to decrypt the products, compute the product (x+Rx)*(y*Ry) of the decrypted number, encrypt this product and transmit the encrypted product E((x+Rx)*(y+Ry)) to the first subsystem. This product equals E(x*y)*E(x*Ry)*E(y*Rx)*E(Rx*Ry).

The first subsystem is configured to encrypt Rx*Ry and to compute the powers (repeated products) $(E(x)^{-1})^{Ry}$, $(E(y)^{-1})^{Rx}$ (the inverses may be numbers that have the property $E(x)*E(x)^{-1}=1$ modulo N). The first subsystem is configured to compute E(x*y) by multiplying E((x+Rx)*(y+Ry)) with the powers $(E(x)^{-1})^{Ry}$, $(E(y)^{-1})^{Rx}$ and the inverse of E(Rx*Ry). By combining such sums and products, a range of algebraic formulas can be evaluated without revealing decrypted data to any one subsystem. It should be emphasized that this protocol is only one of the protocols known in the art for secure multiparty computation. Other protocols may interchange the role of sums and products, using a homomorphic encryption scheme wherein E(x*y)=E(x)+E(y), such as the inverse $E^{-1}$ of a scheme wherein E(x+y)=E(x)*E(y). Other secure multiparty computation protocols are known as well. Any such protocol may be used.

Figure 3:
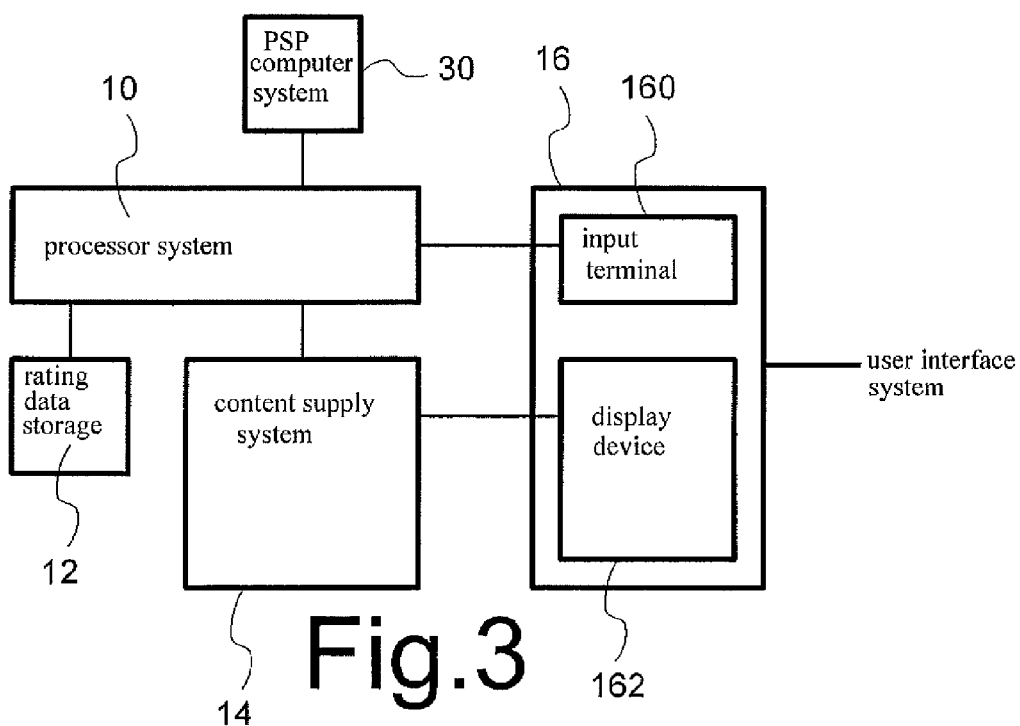
FIG. 3 shows a modified content handling system for secure handling of information

FIG. 3 shows a modified content handling system that allows for secure handling of information about group composition, without requiring use of such data in user interface system 16. The content handling system of FIG. 3 is similar to that of FIG. 1 but with an additional privacy service provider computer (PSP computer) 30, coupled to processor system 10. PSP computer system 30 may be coupled to processor system 10 via a communication network such as the Internet. In the computation of the synthetic ratings R'(m) a computer in user interface system 16 may be configured to function as the first subsystem of the secure multiparty computation and PSP computer system 30 may be configured to function as the second subsystem, (user interface system 16 transmitting information to PSP computer system 30 via processor system 10 or directly).

User interface system 16 may be configured to perform the computations of first top third steps 21-23 to produce encrypted versions E(R'(m)) of the synthetic rating values for the different content items and to supply these to processor system 10 for execution of the remaining steps, optionally using PSP computer system 30. As may be noted this allows access to the clear information about the composition of the group to be limited to user interface system 16. Moreover, user interface system 16 has no clear access to the rating values provided by the different members of the group.

It may be desirable to ensure that the remainder of the system also has no clear access to information that links users to ratings. This may be realized for example by configuring processor system 10 to handle encrypted ratings E(R'(m)), E(R(i,m)) only and to pass these to PSP computer system 30 for decryption and computation of correlations (and optionally selection of the highest correlations). In this case processor system 10 may shield from PSP computer system 30 from information that links ratings R(i,m) to users i, for example by transmitting ratings R(i,m) for the computation of correlations in random order of users and without supplying information that represents the users. PSP computer system 30 may report back the resulting correlations or an identification of the inputs that resulted in the highest correlation with E(R'(m)). In another embodiment a secure multiparty computation protocol may be used to compute the correlations, the processor system 10 and PSP computer system 30 being configured to function as the first and second subsystem in this computation.

In another embodiment it is made unnecessary that the ratings given by the members of the group are supplied by local devices to user interface system 16, e.g. from tokens. The ratings may be supplied from rating data storage 12 via computer system 10 instead, preferably in encrypted form. Normally, if user interface system 16 would request (encrypted) ratings selectively for the members of the group from processor system 10, this would involve revelation of the identity of the members of the group. However, by using a private information retrieval protocol using for example an oblivious transfer protocol, user interface system 16 may access the (encrypted) ratings without revealing the identity.

In the art private information retrieval refers to protocols that allow a user to retrieve an item from a server in possession of a database without revealing to the server which item is retrieved. A simple form of private information retrieval may be realized by oblivious transfer. In the art, oblivious transfer refers to protocols that provide for access to selected information from a first subsystem to a second subsystem, dependent on a selection by the second subsystem, without revealing the selection to the first subsystem. Implementations of such oblivious transfer protocols are known in the art.

In one example, such a protocol comprises encoding of different selectable information items by respective different encoding keys (e.g. numbers to be added to the items), of which only one key (or a predetermined number of the keys) is available in the second subsystem, transmitting the encoded items to the second subsystem and decoding the selected item(s) in the second subsystem. The oblivious transfer protocol may provide for the determination of the keys in a way that ensures that the second subsystem can determine only one of the keys, but with the freedom to choose which. In order to do so, the first subsystem may generate a set of random numbers and supply these to the second subsystem. The second subsystem may then generate the encoding key, encrypt it, choose one number from the set of random numbers, adds the encrypted encoding key to the selected random number and transmit the result to the first subsystem. The first subsystem then generates the plurality of encoding keys, each by subtracting a different one of the random numbers and decrypting the result.

When applied to the recommender system, processor system 10 may be configured to function as the first subsystem of the oblivious transfer protocol and user interface system 16 may be configured as the second subsystem. In principle the transmitted encoded information items of the oblivious transfer protocol could be the ratings R(i,m) for all possible users, but it may suffice to transmit only ratings for a class of users that contains ratings for members of the group, among others users. User interface system 16 may be configured to indicate the class to processor system 10, for example by transmitting a partial user ID of a group member or a hash of the user ID. Alternatively, any other private information retrieval protocol may be used.

In another embodiment, user interface system 16 retrieves the (optionally encrypted) ratings for the members of the group using oblivious transfer and supplies the (encrypted) ratings to PSP computer system 30 or a combination of PSP computer system 30 and processor system 10 for the computation of the (encrypted) synthetic ratings R'(m). Alternatively, a further PSP computer system (not shown) interposed between user interface system 30 and PSP computer system 30 may be used to compute the synthetic ratings using a secure multiparty computation. In this case, the further PSP computer system) and PSP computer system 30 may be configured to function as first and second subsystem in a secure multiparty computation protocol that computes encrypted synthetic rating values. These may then be supplied to processor system 10 or PSP computer system 30 for use in the computation of the correlations.

Figure 4:
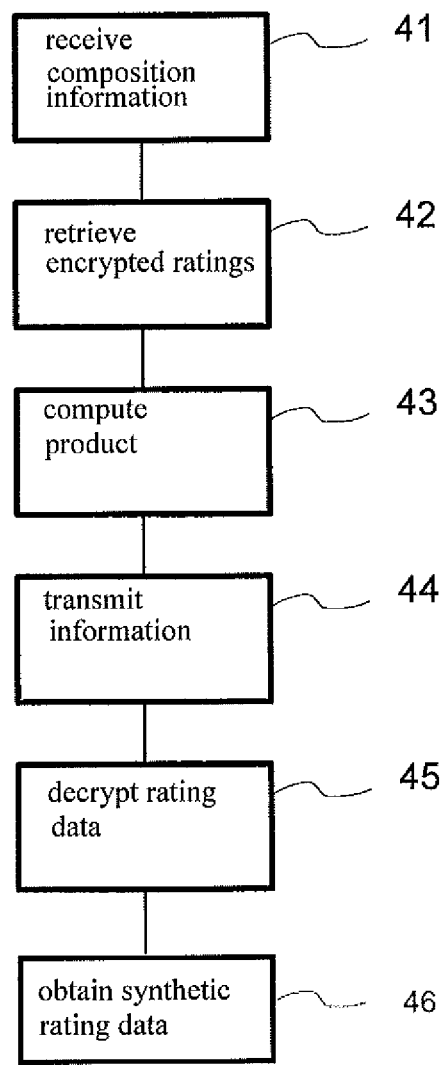
FIG. 4 shows a flow chart of weighting for determining synthetic ratings

Figure 4 shows a flow-chart of operation of weighting for determining synthetic ratings for reference items, using the modified content handling system of FIG. 3. In a first step 41 user interface system 16 receives information indicating the composition of the current group. In a second step 42, user interface system 16 uses private information retrieval to retrieve encrypted ratings R(i,m) for the members of the group through processor system 10. A ratings encrypted using a homomorphic encryption scheme are used (the homomorphic encryption scheme has the property $E(x+y)=E(x)*E(y)$). In a third step 43 user interface system 16 computes a product of the encrypted ratings E(R(i,m)) of the members of the group, to obtain an encrypted version of the sum of these ratings. Optionally, some of the encrypted ratings R(i,m) may be used for a plurality of multiplications, to provide for different weights. Still in third step 43 user interface system 16 transmits the encrypted rating values to processor system 10. In a fourth step 44, processor system 10 transmits the information to PSP computer system 30. In a fifth step 45, PSP computer system 30 decrypts the rating data R(i,m). PSP computer system 30 performs the computation of third and fourth step 23-24 of the process of FIG. 2, which results in synthetic rating data R'(j) for the reference items, obtained 46 by combining rating data for these reference items for selected users, according to the indication of the composition of the current group.

In another embodiment it is avoided to supply rating values need be supplied to user interface system 16. In this embodiment, PSP computer system 30 selects the necessary rating data from data supplied by processor system 10. This may be done by supplying user IDs of group members to PSP computer system 30, for example encrypted by with a public key for which PSP computer system 30 has the corresponding decryption key, and using user IDs supplied by processor system 10 in association with rating data in PSP computer system 30 to select the rating data for the members. However, this would give PSP computer system 30 access to information about the user ID of group members. Alternatively, processor system 10 may blind the user IDs, for example by adding a random number and supplying the rating data in randomized order. In this case, user interface system 16 may similarly blind the user ID of the group members and send the result to PSP computer system 30, for use to select the rating values of the group members for the computation of the synthetic rating values R'(m). If the blinded user ID of the group members are transmitted via processor system 10, they may be encrypted in user interface system 16 and decrypted with a private key in PSP computer system 30. In a further embodiment, selection of the rating values of the group members may be performed by a further PSP computer system (not shown) interposed between user interface system 30 and PSP computer system 30. In this case, the further PSP computer system) and PSP computer system 30 may be configured to function as first and second subsystem in a secure multiparty computation protocol that computes the synthetic rating values and supplies encrypted versions of these values to processor system 10 for use in the computation of the correlations.

In another embodiment, processor system 10 may apply the blinding to encrypted user IDs of the group members, the user interface system 30 transmitting the encrypted user IDs of the group members to processor system 10. In this case a homomorphic encryption scheme may be used, so that processor system 10 may apply the blinding by multiplying the encrypted user IDs of the group members with (encrypted) random numbers, which has the effect that the product corresponds to an encryption of the sum of the user ID and the random number according to the homomorphic encryption scheme. Processor system 10 then transmits the blinded encrypted user IDs of the group members to the PSP computer system 30, which performs a part of the computation that cannot be performed without decryption and returns encrypted results. As a result of blinding, decryption of the blinded encrypted user IDs of the group members by the PSP computer system 30 does not reveal the identity of the group members in the PSP computer system 30. At the same time the identity is not revealed in processor system 10, because it only has encrypted user IDs.

In an embodiment that comprises comparing the IDs of the group members with user IDs associated with stored ratings, processor system 10 preferably randomizes order in which the latter user are supplied, so that PSP computer system 30 will be unable to infer identities from the position in the randomized order. Processor system 10 may blind the encrypted IDs of the group members and encrypted user IDs associated with stored ratings, by multiplying both with the same random number.

PSP computer system 30 may return an encrypted bit vector wherein bits are set at positions that correspond to position in the order of supply, where processor system 10 supplied blinded encrypted user IDs equal to the user IDs of the members of the group. Thus processor system 10 receives information about the positions of the members of the group in encrypted form. Alternatively, processor system 10 may supply rating data ordered according to the user IDs, in which case PSP computer system 30 may return rating values for the equal user IDs instead of the bits. It may be noted that homomorphic encryption schemes are generally probabilistic, or at least that a probabilistic homomorphic encryption scheme may be used, to that encryption of the same information does not normally result in equal encrypted data.

The computation of collaborative filtering may similarly be performed by cooperation of processor system 10 and PSP computer system 30 that is distinct from processor system 10 (i.e. not implemented in the same machine). In this case homomorphic encryption of the rating data and blinding of the encrypted rating data may be used. Processor system 10 then transmits the blinded encrypted rating data to the PSP computer system 30, which performs a part of the computation that cannot be performed without decryption and returns encrypted results. PSP computer system 30 may be used to perform multiplication of rating values in the computation of correlations, selection of users with highest correlations, or at least positions of highest correlations in a vector of correlations and/or selection of rating values given by the users with highest correlations. These operations can be performed by steps that involve decryption of blinded encrypted rating data in the PSP computer system 30, and subsequent removal of the blinding from encrypted results. Secure multiplication protocols and secure comparison protocols are known per se that can be used to do so.

FIG. 5 shows another flow-chart of operation of weighting for computing recommendation scores, using the modified content handling system of system of FIG. 3. In this embodiment rating data R(i,m) for individual users i as well as for groups of users i may be used to form recommendation scores. Rating data storage 12 stores encrypted rating data R(i,m) for user IDs i (which may correspond to individual users or groups of users) and encrypted information indicating the group compositions for the user IDs, i.e. of groups or single users with which rating data is associated. The encrypted information indicates a group composition for example in the form of an encrypted vector of bits that each correspond to a respective individual user. The vector (e.g. 00100000) has only one bit set when the user ID corresponds to an individual user and a plurality of bits set (e.g. 01001010) if the user ID corresponds to a group with a plurality of users.

In an optional first process 51 a set of users (or groups) may be selected. This may be done by means of the steps of the process of FIG. 2 or 4, for example, based on correlation between ratings for reference items, or based on correlation between attributes of users.

In a second step 52, processor system 10 retrieves encrypted information that indicates the group/single user composition of user IDs associated with the rating data (indicating a single user when the rating data is provided for that single user, and a plurality of users when the rating data is provided for a group with a plurality of users).

Additionally processor system 10 may forward the encrypted information indicating the composition of the current group, for which a recommendation is requested (this current group may consist of a single user or a plurality of users) from user interface system 16 to PSP computer system 30. Processor system 10 may also send encrypted information indicating a selected set of correlated users may be transmitted as well. But if this information is already available in PSP computer system 30, it need not be transmitted.

In a third step 53, processor system 10 and PSP computer system 30 perform a secure set intersection protocol to determine the overlap between the compositions associated with the user IDs and the current group, optionally only for a selected set of user IDs. In the art, the term secure set intersection refers to protocols for determining set overlap by cooperation by two subsystems, without revealing the composition of both sets to any one of the two subsystems. Implementations of secure set intersection are known in the art. In the present embodiment, this allows processor system 10 and PSP computer system 30 to determine the overlaps without access to the compositions associated with the user IDs In a fourth step 54, processor system 10 uses encrypted information about the size of the overlap between the compositions associated with the user IDs and the current group to set encrypted weight values W(i) for the user IDs. The weight values may be set in proportion to the size of the overlap for example. In a fifth step 55, processor system 10 and PSP computer system 30 uses use a secure multiparty computation to compute a weighted sum W(i)*R(i,j) of ratings R(i,j) for the user IDs. In an embodiment, PSP computer system 30 may select the weights W(i) in proportion to the number M of overlapping individual users, divided by the number N of individual user M of one of the groups. The number N may be transmitted in the clear in the clear, as it does not reveal the composition. Fourth and fifth steps 54, 55 may be repeated for a plurality of different items.

In a sixth step 56, processor system 10 or PSP computer system 30 transmits the resulting weighted rating for an item or ratings for different items to user interface system 16, where they may be used to select items and/or rank 57 items for display on user interface system 16.

Although the previous secure embodiments have been described for the computation of synthetic rating values R' (m) for the group, for use in the determination of correlation between these synthetic rating values R'(m) and stored ratings R(j,m), it should be appreciated that similar secure computations can be used if correlations C(i,j) are first determined using ratings R(i,m) for the individual group members i and the correlations C(i,j) are subsequently used to determine correlations for the group.

In this case, a further PSP computer system (not shown) may be interposed between processor system 10 and PSP computer system 30. User interface system 16 may supply encrypted ratings R(i,m) for the individual group members i to the further PSP computer system that also receives encrypted ratings R(j,m) from processor system 10. The further PSP computer system and PSP computer system 30 may be configured to use secure multiparty computation to compute the correlations between the ratings for the group members and the ratings supplied by processor system 10. The further PSP computer system may then compute the correlation for the group from the correlation for the group members, for example as a weighted average, which may be computed using a secure multiparty computation involving the further PSP computer system and user interface system 30.

In the embodiment where group types are used, a secure implementation may be used as well. The information about group type of the current group may be encrypted, to avoid access to clear data. In this embodiment, user interface system 16 may determine the group type and encrypt it, or weights for respective group types as determined using match functions, before supplying this information to processing system 10. Processing system 10 and PSP computer system 30 may use the information in a secure multiparty computation to compute synthetic rating values, combined correlations and/or recommendation scores S(n). Similarly, the match functions may be evaluated by means of a secure multiparty computation, wherein user interface system 16 functions as first subsystem and PSP computer system 30 functions as second subsystem. This allows user data like sex and age may be kept stored and supplied to user interface system 16 in encrypted form.

As used herein a device or system is said to be configured to perform a function for example if the device or system contains one or more programmable computers in a computer readable medium that, when executed by the computer or computers causes the computer or computers to execute the functions. The device or system is also said to be configured to perform the function if part or all of the function is executed by a circuit that is specifically designed to perform the function or part of it, a computer or computers being configured to execute a remainder of the function.

The invention claimed is:

1. A recommender system, comprising:
a storage system for storing data representing stored rating values for media items; and
a processing system comprising a non-transitory computer readable medium having a computer program embodied thereon, the computer program including instructions for causing a processor to record an input rating value for a first one of the media items in the storage system, based on measured activity or input of a user, and to record information as recorded information about a first group of users in the company of which the input rating value applies for the user, the input rating value for a first one of the media items being dependent upon, and recorded in association with, said recorded information about said first group of users, wherein the processing system is configured to:
compute a recommendation score for a second group of users from the input rating value, dependent on a comparison of the second group of users and the recorded information about the first group in association with which the rating value was recorded; and
record an identification of the user, wherein the recorded information comprises an identification of at least one further user that was detected to be in the company of the user in said first group when the activity of the user was measured or when the input of the user was entered.

2. A recommender system according to claim 1, comprising a user terminal configured to obtain information that identifies users present in proximity of the user terminal at a time when the activity of the user is measured or when the input of the user is entered, the recorded information about the first group of users including the information from the terminal that identifies the users present in proximity of the user terminal at said time.

3. A recommender system according to claim 1, comprising a rendering terminal, for rendering a selected ones of the media items, and a detector configured to determine identifications of users present at the rendering terminal when the selected ones of the media items is rendered, the processing system being configured to record the determined identifications in combination with the rating value, when the rating value is recorded upon rendering of the first one of the media items.

4. A recommender system according to claim 1, comprising a user terminal coupled to the processing system and configured to transmit data derived from the measured activity or input of the user to the processing system in association encrypted information about a composition of the first group.

5. A recommender system according to claim 1, wherein the processing system is configured to compute a weighted sum of rating values for the first one of the media items, the recorded input rating value being weighted dependent on a count of users that is common to the first and second group.

6. A recommender system according to claim 5, wherein the information about the first group is encrypted information about a composition of the first group, the processing system being configured to transmit the encrypted information about the composition of the first group and encrypted information about the composition of the first group to a privacy service provider and to assign a weight to the recorded input rating value dependent on a response from the privacy service provider.

7. A recommender system according to claim 6, comprising the privacy service provider, the privacy service provider being configured to determine a count of users that are common to the first and second group from the encrypted information about the composition of the first and second group, the processing system or the privacy service provider computing the weight from said count.

8. A recommender system according to claim 1, wherein the recorded information about the first group comprises an indication of one of a predetermined set of group types.

9. A recommender system according to claim 8, wherein the processing system is configured to compute a weighted sum of rating values for the first one of the media items, the recorded input rating value being weighted dependent on a comparison of a group type of the second group and the indication of the group type of the first group.

10. A media retrieval system comprising a recommender system according to claim 1, wherein the user interface system comprises a user terminal, wherein the user terminal is configured to display selectable options from a list of options at a user terminal, the list of options being constructed using the recommendation scores, and to cause a media item to be retrieved and start rendering the retrieved media item in response to selection from the list of options.

11. A method of generating a recommendation score for a media item, the method comprising:
acquiring a rating value for a media item from a user, by measuring activity of the user and/or receiving input of the user;
acquiring information about a first group of users in the company of which the acquired rating value applies for the user and recording said information as recorded information;
recording the acquired rating value for the media item, said acquired rating value being dependent upon, and recorded in combination with, said recorded information about the first group of users;
computing a recommendation score for a second group of users from the acquired rating value, dependent on a comparison of the second group of users and the recorded information about the first group in association with which the rating value was recorded; and
recording an identification of the user, wherein the recorded information comprises an identification of at least one further user that was detected to be in the company of the user in said first group when the activity of the user was measured or when the input of the user was entered.

12. A method according to claim 11, wherein said computing the recommendation score comprises determining a count of users that belong to both the first and the second group and assigning a weight to the first one of the input rating values dependent on said count.

13. A method according to claim 11, wherein the recorded information about the first group comprises an indication of one of a predetermined set of group types, the input rating value applying for the user when the user is part of a group of the indicated group type, the method comprising assigning a weight to the rating value dependent on a degree of match between the group type of the first group and second group and computing a recommendation score for a second group of users using the rating value weighted by said weighting value.

* * * * *